H. B. MOLESWORTH.
MEANS FOR THE TRANSMISSION OF MOTIVE POWER TO MACHINERY.
APPLICATION FILED JULY 24, 1917.
1,370,899.
Patented Mar. 8, 1921.
2 SHEETS—SHEET 1.
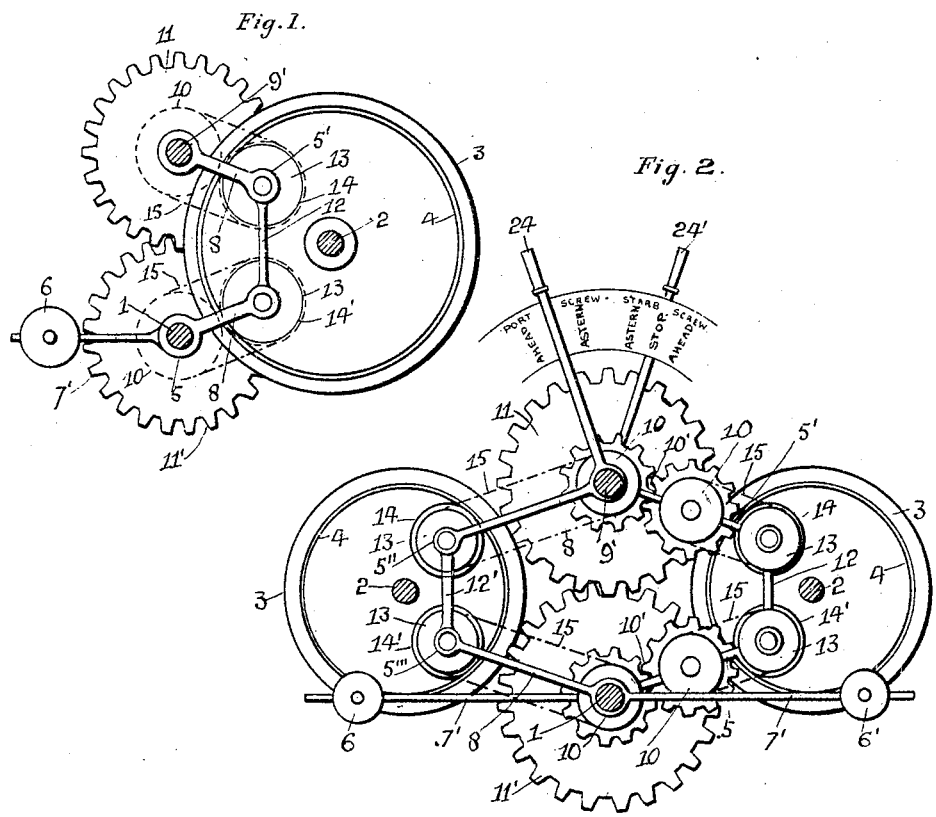
INVENTOR
Henry Bridges Molesworth
by M Wallace White
his Attorney

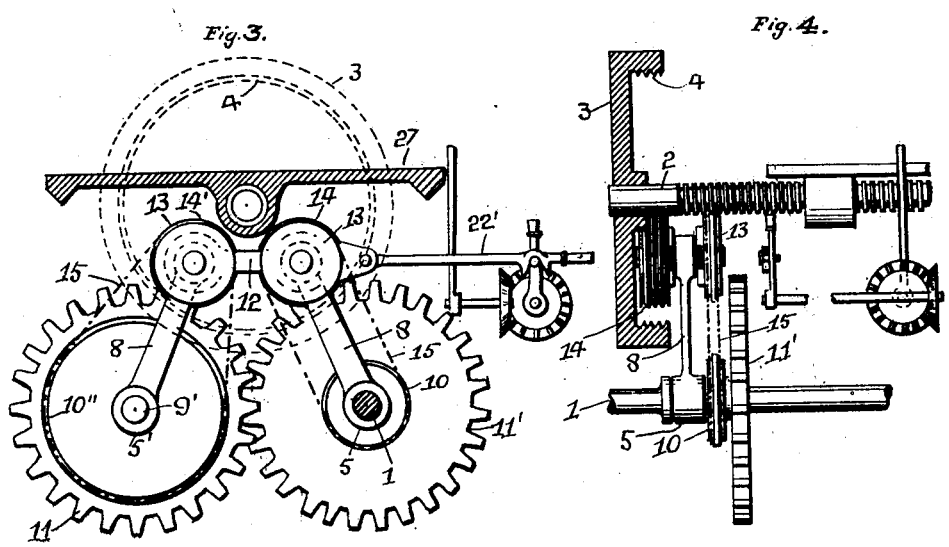

UNITED STATES PATENT OFFICE.

HENRY BRIDGES MOLESWORTH, OF WESTMINSTER, LONDON, ENGLAND, ASSIGNOR TO THE LONDON AND WESTMINSTER INDUSTRIAL SYNDICATE LIMITED, OF LONDON, ENGLAND.

MEANS FOR THE TRANSMISSION OF MOTIVE POWER TO MACHINERY.

1,370,899.   Specification of Letters Patent.   Patented Mar. 8, 1921.

Application filed July 24, 1917. Serial No. 182,394.

*To all whom it may concern:*

Be it known that I, HENRY BRIDGES MOLESWORTH, a subject of the King of Great Britain, whose post-office address is St. James Park Chambers, 32 Broadway, in the city of Westminster, London, England, Great Britain, have invented new and useful Improvement in Means for the Transmission of Motive Power to Machinery, whereby the direction of rotation of such machinery may be reversed and whereby continuous rotary movement may be converted into reciprocating movement.

In the specification relating to British patent granted to Horace Lawrence Sharpe and Rhodesian Enterprises Limited dated 14th May, 1915 and numbered 7268 for that year, there are set out and referred to means for the transmission of power consisting of a bar swinging on a power shaft and carrying rotatably a friction wheel and a sprocket wheel geared to the power shaft by means of a sprocket wheel and chain such means (hereinafter referred to as the radial arm) being so arranged that the friction wheel may be brought into contact with a driving surface the friction wheel and driving surface so co-acting that (in accordance with the hitherto-known principle) the useful force between the surfaces in contact tends to produce an increment in the pressure between such surfaces that it automatically reinforces the initial pressure with which they are brought into contact. The device referred to, however, is only operative in one direction. The object of my invention is to provide means whereby the radial arm may be so combined with other elements that power exerted in one direction for driving machines of various kinds and contrivances accessory thereto as will enable the operative motion of the driven machines or contrivances to be reversed, *i. e.* the power so applied to operate such machines or contrivances in two directions; and also enable continuous rotary motion to be converted into reciprocating linear motion and yet in both cases maintain the automatically varying pressure between the contacting surfaces notwithstanding the fact that the motion of the machine or contrivance is changed into the reverse direction.

My invention, therefore, consists in combining the radial arm with co-acting parts that motion in two directions may be transmitted through the friction wheel which each arm carries to mechanism to be driven and at the same time insure the pressure of contact or grip between the friction wheels and the driven surface being automatically varied directly with the energy transmitted in the two directions of motion of the driven surface.

I attain the object of my improvements by the mechanism illustrated in the accompanying drawings in which:—

Figure 1 illustrates diagrammatically means whereby according to one method of carrying out this invention power may be applied for the rotation of mechanism in either a right or left hand direction.

Fig. 2 illustrates diagrammatically the means whereby this invention may be applied to the purposes of transmission of power in two directions from a continuously running engine to the propellers of a twin screw boat.

Fig. 3 is an end view of part of an ordinary screw shaft operated planing machine, and illustrates the means whereby this invention may be applied thereto.

Fig. 4 is a side view of same partly in section.

The same reference numerals denote the same parts throughout the several figures.

Referring to Fig. 1, 1 indicates shafting rotated by the power to be transmitted to the machine or apparatus to be driven. 2 is the shaft of such machine or apparatus by which the power is to be received. To the shaft 2 I rigidly secure a wheel 3 which wheel I provide with the friction surface 4. 9' is a lay shaft which I conveniently arrange relatively to the mechanism to be driven and the power shafting 1, which lay shaft is geared to the power shafting 1 by means of the wheels 11, 11' so that such shafts may rotate in opposite directions. Swingingly supported on each of the shafts 1 and 9' is a radial arm 5, 5', such radial arms consisting (as more clearly shown by Fig. 7) of the bar 8 carrying a rotatable shaft 28 on which shaft is rigidly fixed the friction wheel 14 or 14' and the sprocket wheel 13 driven by the sprocket wheel 10 and chain 15, the said arms being pivotally connected by a link 12. 6 is a balance weight carried by the auxiliary bar 7' integral or rigid with the bar 8 of the radial arm 5. When the weight 6 is depressed the friction wheel 14 carried by the radial arm 5' is brought into contact with the friction surface 4 and simultaneously the friction wheel 14' carried by the radial arm 5 is moved away from the friction surface 4 and the mechanism is driven in one direction. By raising the weight 6 the friction wheel 14 is removed from contact with the friction surface and the friction wheel 14' is brought into contact with the friction surface and the direction of travel of the shaft 2 is reversed and the mechanism is driven in the opposite direction. When the weight 6 is moved into the intermediate position neither of the friction wheels is in contact with the friction surface and the engine runs free.

Referring to Fig. 2, in this instance 2 denotes the propeller shafts of a boat and to each of such shafts I rigidly secure a wheel 3 each such wheel being provided with the friction surface 4. The lay shaft 9' which I also provide in this instance is geared to the power shaft 1 by means of wheels 11. 11'. so that the shafts 1 and 9' rotate in opposite directions. 5. 5'. 5''. 5''' are the radial arms pivotally connected by links 12. 12'. 6. 6' are balance weights carried on the prolongations 7' of the radial arms 5' and 5''', and 24 and 24' are levers controlling the port and starboard propellers respectively, by means of which levers the friction wheels 14. 14' are brought into or removed from contact with the friction surface 4.

It will be observed that on one side of the apparatus as shown by Figs. 2 at 10' it is necessary to provide gearing to reverse the direction of rotation of the friction wheels in order that the said friction wheels may automatically grip the friction surface. The direction of rotation of the shaft carrying the wheels 3 is determined according to which of the friction wheels carried by each pair of arms is brought into contact with the friction surface on the wheel 3 as will be readily understood.

Referring to Figs. 3 and 4, to the usual screw threaded operating shaft of the planing or the like machine of known type I rigidly secure the wheel 3 having the friction surface 4. I provide a lay shaft 9' also in this instance the said shaft being geared by means of the wheels 11. 11' to the power shaft 1 so that the shafts may rotate in reverse directions. The respective radial arms 5. 5'. are swingingly supported on the power shaft 1 and lay shaft 9' and are at their friction wheel ends pivotally connected by a link 12, to which is secured an ordinary system of levers and bevel gears, such as is shown in the figures operated by stops fixed on the machine table by means of which alternate contact and removal from contact of the respective friction wheels 14. 14'. with the friction surface 4 on the wheel 3 in order to reverse the direction of travel of the machine table, is effected.

The sprocket wheel 10'' as shown is designed to give a quick return motion to the machine table.

From the foregoing, it will be observed that the mere contact of the friction wheel with the friction surface causes the former to automatically grip the latter by reason of the rotary motion imparted by the source of power and the movement of the friction wheel with the result that contact in both directions of movement is maintained without any extraneous means till such contact is designedly interrupted.

It will also be observed that the friction wheel or wheels may be brought into and moved from contact with the friction surface or surfaces by any suitable means and where levers are shown such levers are employed for that purpose only and not for the maintaining of pressure between such parts.

In the drawings the friction surfaces are shown as a series of parallel grooves but a single groove or a plain surface may be used.

Any known materials used for friction surfaces may be employed.

In many applications of this invention the automatic grip being instantaneous it is advisable to introduce some form of shock absorber.

I claim:

1. Power transmission mechanism comprising a driving shaft, a lay shaft, gears fixed to said shafts and meshing with each other, a wheel adapted to be driven by said driving shaft, a pair of friction wheels within said wheel and movable to engage the inner periphery of the wheel, and means for operatively connecting the friction wheels to the driving and lay shafts, respectively.

2. Power transmission mechanism comprising a driving shaft, a lay shaft, gears fixed to said shafts and meshing with each other, a wheel adapted to be driven by said driving shaft, a frame pivoted to said shafts, friction wheels engageable with the wheel and mounted on said frame, means for operatively connecting the friction wheels to the lay shaft and driving shaft, respectively, and means for biasing the same to a predetermined position.

3. Power transmission mechanism as embodied in claim 2, wherein said biasing means comprises an arm fixed to the frame and a weight adjustably mounted on the arm.

Dated July 2nd, 1917.

HENRY BRIDGES MOLESWORTH.

Witnesses:
 W. C. FOWLER,
 B. H. BOWLES.